(12) United States Patent  (10) Patent No.: US 7,864,476 B2
Ehrlich  (45) Date of Patent: Jan. 4, 2011

(54) LOW TRACK-PER-INCH (TPI) ZONE WITH REDUCED NEED FOR ADJACENT-TRACK-ERASURE (ATE) REFRESH

(75) Inventor: Richard M. Ehrlich, Saratoga, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 323 days.

(21) Appl. No.: 12/052,480

(22) Filed: Mar. 20, 2008

(65) Prior Publication Data

US 2009/0237842 A1   Sep. 24, 2009

(51) Int. Cl.
  *G11B 15/04* (2006.01)
  *G11B 19/04* (2006.01)
  *G11B 27/36* (2006.01)

(52) U.S. Cl. .......................... 360/60; 360/31
(58) Field of Classification Search ............ None
  See application file for complete search history.

(56) References Cited

U.S. PATENT DOCUMENTS

| 6,009,537 | A  | * | 12/1999 | Tanimoto et al. ........... 714/8 |
| 6,469,855 | B1 |   | 10/2002 | Lamberts et al. |
| 7,102,838 | B2 |   | 9/2006  | Kim et al. |
| 7,110,197 | B2 |   | 9/2006  | Cho |
| 7,177,979 | B2 | * | 2/2007  | Kuwamura ............. 711/112 |
| 2005/0078393 | A1 |   | 4/2005 | Cho |
| 2006/0066971 | A1 |   | 3/2006 | Alex et al. |
| 2006/0132954 | A1 | * | 6/2006 | Wada et al. ............ 360/48 |
| 2006/0245102 | A1 |   | 11/2006 | Cheng |
| 2007/0127150 | A1 |   | 6/2007 | Cho et al. |
| 2007/0242386 | A1 |   | 10/2007 | Finamore et al. |

* cited by examiner

*Primary Examiner*—Daniell L Negrón
(74) *Attorney, Agent, or Firm*—Schwegman, Lundberg & Woessner, P.A.

(57) ABSTRACT

Methods and systems are shown that specify at least one low track-per-inch (TPI) region and at least one normal TPI region on a disk. The low TPI region may be used to store information that may be rewritten frequently. The normal TPI region may be used to store information that may be rewritten less frequently. The low TPI region may reduce the need for adjacent-track-erasure (ATE) refresh.

16 Claims, 9 Drawing Sheets

LOW TRACK-PER-INCH (TPI) ZONE WITH REDUCED NEED FOR ADJACENT-TRACK-ERASURE (ATE) REFRESH

BACKGROUND

A disk drive is an information storage device. A disk drive includes one or more disks clamped to a rotating spindle and at least one head for reading information representing data from and/or writing data to the surfaces of each disk. The head is supported by a suspension coupled to an actuator that may be driven by a voice coil motor. Control electronics in the disk drive provide electrical signals to the voice coil motor to move the head to desired positions on the disks to read and write the data in tracks on the disks and to park the head in a safe area when not in use or when otherwise desired for protection of the disk drive.

One problem with disk drives is the potential of data loss experienced by tracks that are adjacent to a track that experiences a high frequency of write operations.

DETAILED DESCRIPTION

For some example embodiments, methods of and systems for reducing the need for alternate-track-erasure (ATE) refresh are disclosed. A disk may include one or more tracks associated with track spacing different from other tracks. Information associated with high frequency of write operations may be stored on a track that is associated with more track spacing.

Other features will be apparent from the accompanying drawings and from the detailed description that follows. In the following description, for purposes of explanation, numerous specific details are set forth in order to provide a thorough understanding of embodiments. It will be evident, however, to one skilled in the art that the present description may be practiced without these specific details.

Hereinafter, example embodiments of the present invention will be described with reference to the drawings. In the following description, the term adjacent is defined to include locations immediately adjacent and within a nearby distance from an object being discussed.

Introduction

Protecting the integrity of information stored on a magnetic disk is an important criterion of disk drive manufacturers. As a number of write operations on a particular track increases, the potential of these write operations affecting the integrity of the information stored on the adjacent tracks may increase. This problem is commonly referred to as Adjacent Track Erasure (ATE) problem. One solution to address the ATE problem is to design heads that can be used to perform many write operations and still not affecting the adjacent tracks. However, at certain points, the criteria for the head design may be too high resulting in head yield problems. Some significant fraction of the heads may either not be able to write the track at a high frequency, or their use may affect the information stored on the adjacent tracks. Another solution is to reduce the standards for head design and increase the frequency for ATE refresh. This may not be ideal as it may affect the overall performance of the disk.

As will be described, some example embodiments of the present invention may provide techniques for accommodating the information associated with the high frequency of write operations while maintaining the integrity of the information stored on the adjacent tracks and with little impact on the overall performance and storage capacity of the disk.

Hard Disk Assembly (HDA)

Figure 1:
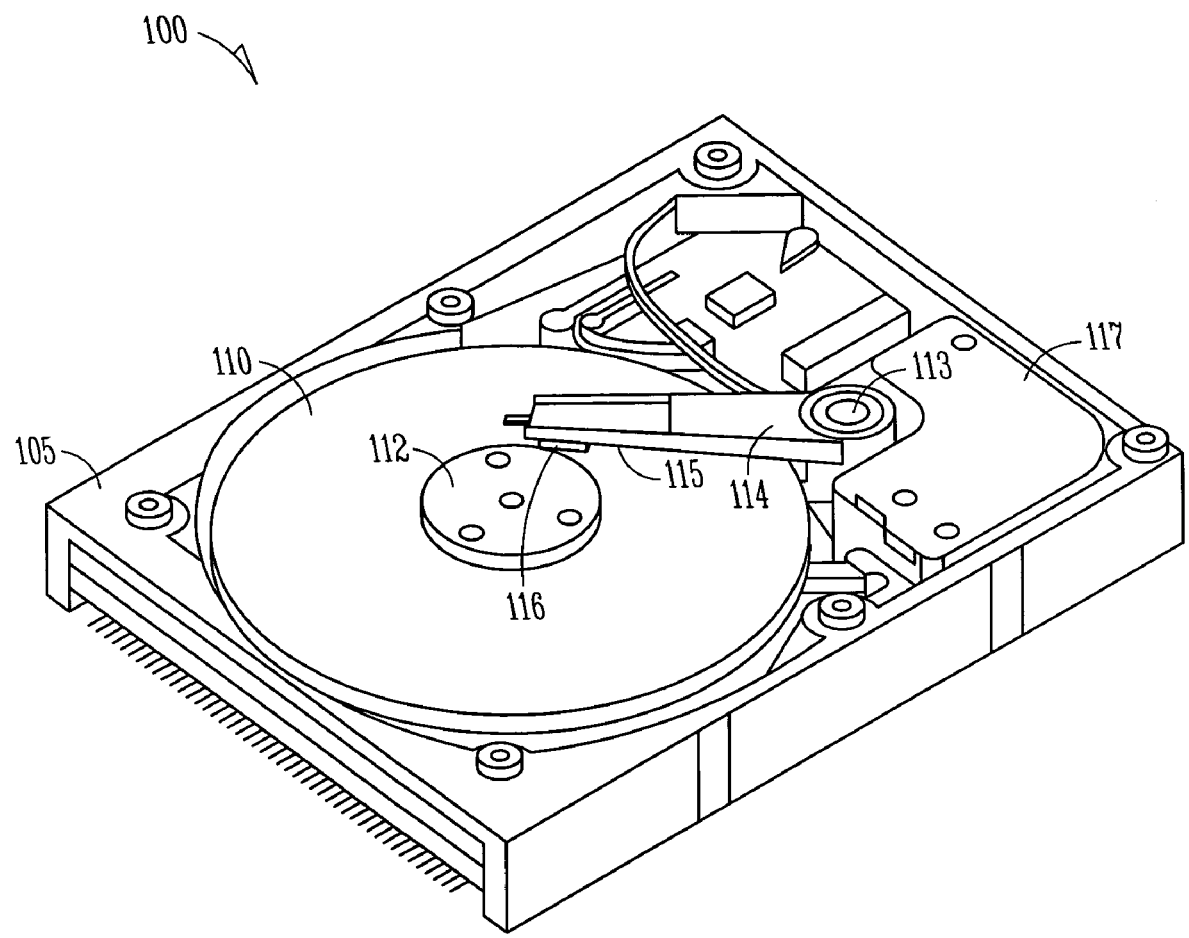
FIG. 1 is a perspective view of a magnetic recording and reproducing apparatus (or disk drive) according to an example embodiment.

FIG. 1 is a perspective view of a hard disk assembly, according to an example embodiment. Hard disk assembly (HDA) 100 may also be referred to as a magnetic recording and reproducing apparatus. The HDA 100 may be associated with a host computer system (e.g., a personal computer system) and may comprise, inside a chassis 105, a magnetic disk 110, a head slider 116 including a read head and a write head, a head suspension assembly (a suspension 115 and an actuator arm 114) that supports the head slider 116, a voice coil motor (VCM) 117. A circuit board may be attached to the HDA 100. The HDA 100 may include a head integrated circuit (IC) (also sometimes referred to as a preamp-chip) to generate control signals for controlling read and write operations performed by the magnetic head.

The magnetic disk 110 is mounted on and rotated by a spindle motor 112. Various digital data are recorded on the magnetic disk 110. In an example embodiment, the magnetic head incorporated in the head slider 116 is an integrated head including a write head of a single pole structure and a read head using a shielded magneto resistive (MR) read element (such as a GMR film or a TMR film). The suspension 115 is held at one end of the actuator arm 114 to support the head slider 116 to face the recording surface of the magnetic disk 110. The actuator arm 114 is attached to a pivot 113. The voice coil motor (VCM) 117, which drives the actuator, is provided at the other end of the actuator arm 114. The VCM 117 drives the head suspension assembly to position the magnetic head at an arbitrary radial position of the magnetic disk 110.

The circuit board may include a power integrated circuit (often referred to as a "combo-chip") to generate driving signals for the VCM 117 and the spindle motor 112, and a system-chip (often referred to as an "SOC" or "System-On-a-Chip") which communicates with the host computer system, coordinates the transfer of data between the host computer system, any buffer memory of the disk drive, and the head IC. The SOC generally may contain at least one microprocessor, a read/write channel, a data-controller to facilitate the above-mentioned data-transfers. The SOC may also contain the buffer memory of the disk drive. In some example embodiments, the buffer memory of the disk drive may be contained in another IC, usually a DRAM (Dynamic-Random-Access-Memory). For some example embodiments, the SOC will control that DRAM chip as well.

Magnetic Disk

Figure 2:
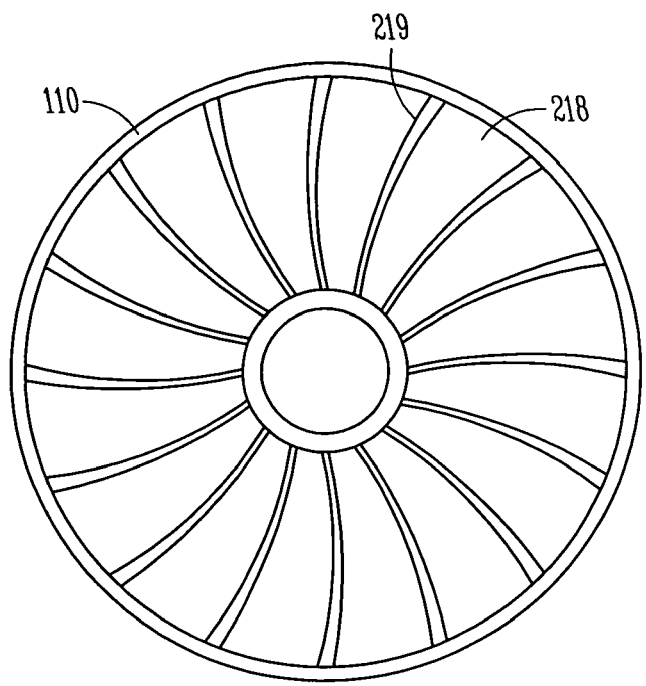
FIG. 2 is a schematic plan view of a magnetic disk according to an example embodiment.

FIG. 2 is a schematic plan view of a magnetic disk 110 according to an example embodiment. FIG. 2 shows data zones 218 and servo zones 219. User data/information is recorded in each of the data zones 218. This example magnetic disk 110 has tracks formed of concentric magnetic patterns. The recording tracks will be described later by way of example with reference to FIG. 3. Servo data for head positioning is formed in each of the servo zones 219 as patterns of a differently magnetized material. In one example embodiment as shown in FIG. 2, each of the servo zones 219 is shaped like a circular arc corresponding to a locus of a head slider during access.

Figure 3:
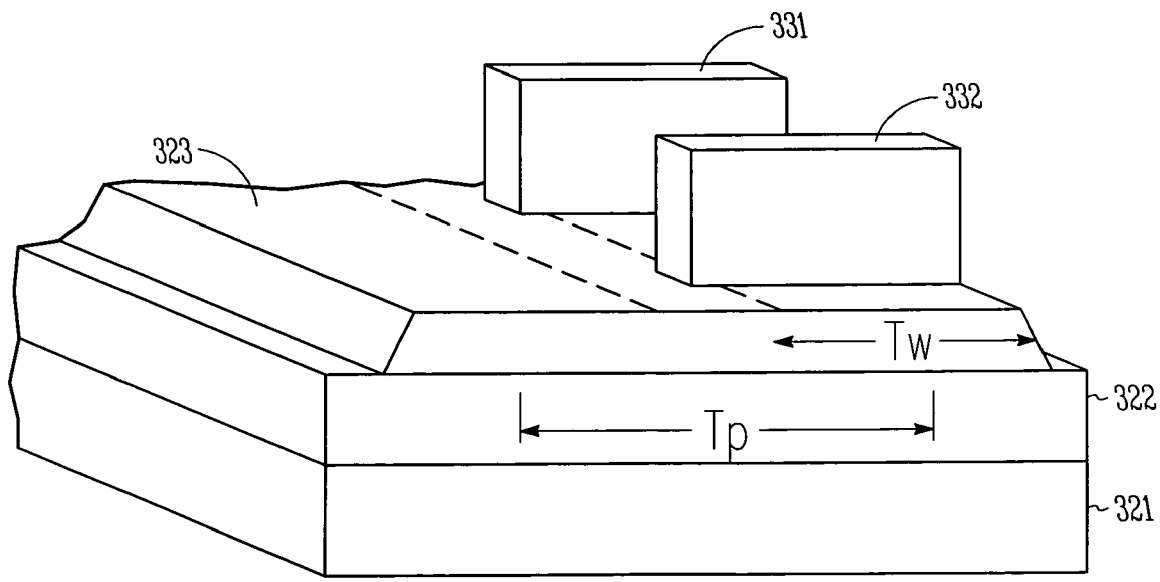
FIG. 3 is a perspective view of a portion of a magnetic disk according to an example embodiment.

FIG. 3 is a perspective view of one example of a data zone in a magnetic disk media according to an example embodiment. A soft underlayer 322 is formed on a substrate 321 with magnetic patterns constituting the recording tracks 323. The radial width and track pitch of the recording track 323 are denoted as Tw and Tp, respectively. A GMR element 331 of a read head and a single pole 332 of a write head, which are formed in the head slider, are positioned above the recording track 323.

As the substrate 321, a flat glass substrate may be used. The substrate 321 is not limited to the glass substrate but an aluminum substrate (or any other suitable substrate) may be used. A magnetic material is placed onto the substrate 321 and selectively magnetized to form recording tracks. A magnetic material such as CoCrPt may be used, although example embodiments are not so limited. Although not shown, a protective film of diamond-like carbon (DLC) may be formed on the surfaces of the media. In one example, lubricant may be applied to the surface of the protective film.

Figure 4:
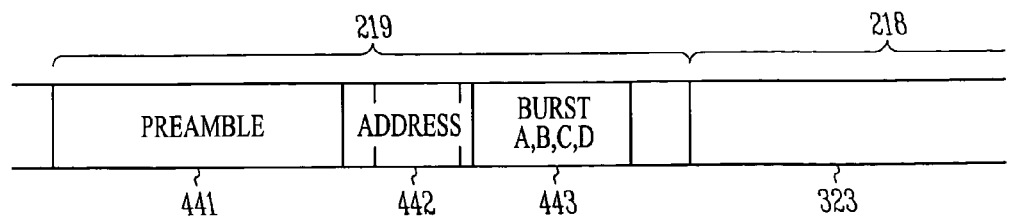
FIG. 4 is a schematic diagram showing a servo zone and a data zone in a magnetic disk according to an example embodiment.
Figure 5:
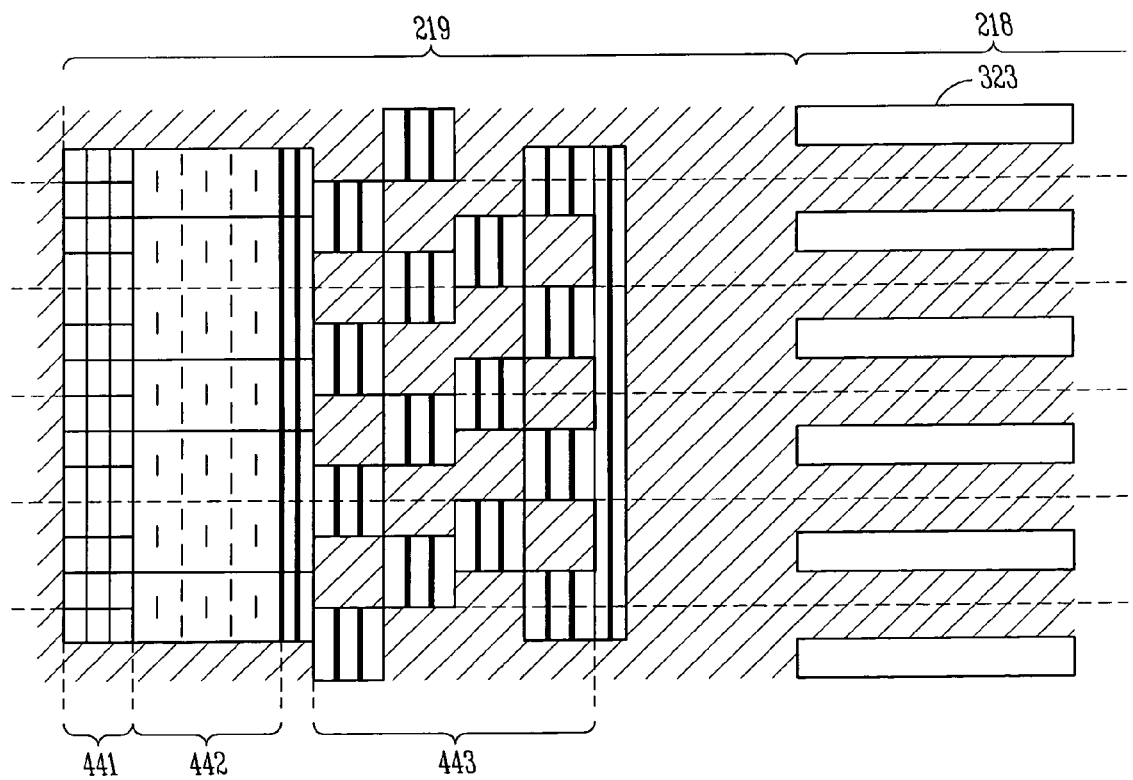
FIG. 5 is a plan view showing patterns in a servo zone and a data zone in a magnetic disk according to an example embodiment.

With reference to FIGS. 4 and 5, the patterns of the servo zones 219 and data zones 218 will be described. As schematically shown in FIG. 4, each of the servo zones 219 includes a preamble section 441, an address section 442, and a burst section 443 for detecting deviation.

As shown in FIG. 5, the data zone 218 includes the recording tracks 323. Patterns of the magnetization which provide servo signals are formed in each of the preamble section 441, address section 442, and burst section 443 in the servo zones 219. These sections may have the functions described below.

The preamble section 441 is provided to execute a phase lock loop (PLL) process for synthesizing a clock for a servo signal read relative to deviation caused by relative motions of the heads and media, and an AGC process for maintaining appropriate signal amplitude.

The address section 442 may have servo signal recognition codes called servo-address-marks, sector data, cylinder data, and the like formed at the same pitch as that of the preamble section 441 in the circumferential direction using encoding, for example Manchester, or other types of encoding. The burst section 443 is an example of an off-track detecting region used to detect the amount of off-track with respect to the on-track state for a cylinder address. The burst section 443 includes patterns to locate a read or write head with respect to a desired track center. A pattern in FIG. 5 is shown by way of example including four fields of burst marks (A, B, C, and D), whose patterns in a radial direction are shifted relative to each other in respective fields. Other burst patterns could also be used. In one example, plural marks are arranged at the same pitch as that of the preamble section in the circumferential direction.

The principle of detection of a position on the basis of the burst section 443 will not be described in detail. When using the pattern shown, the off-track amount may be obtained by calculating a function of the average amplitude value of read signals from the A, B, C, and D bursts. As discussed above, other patterns may be used that do not depend on average amplitude.

Figure 6:
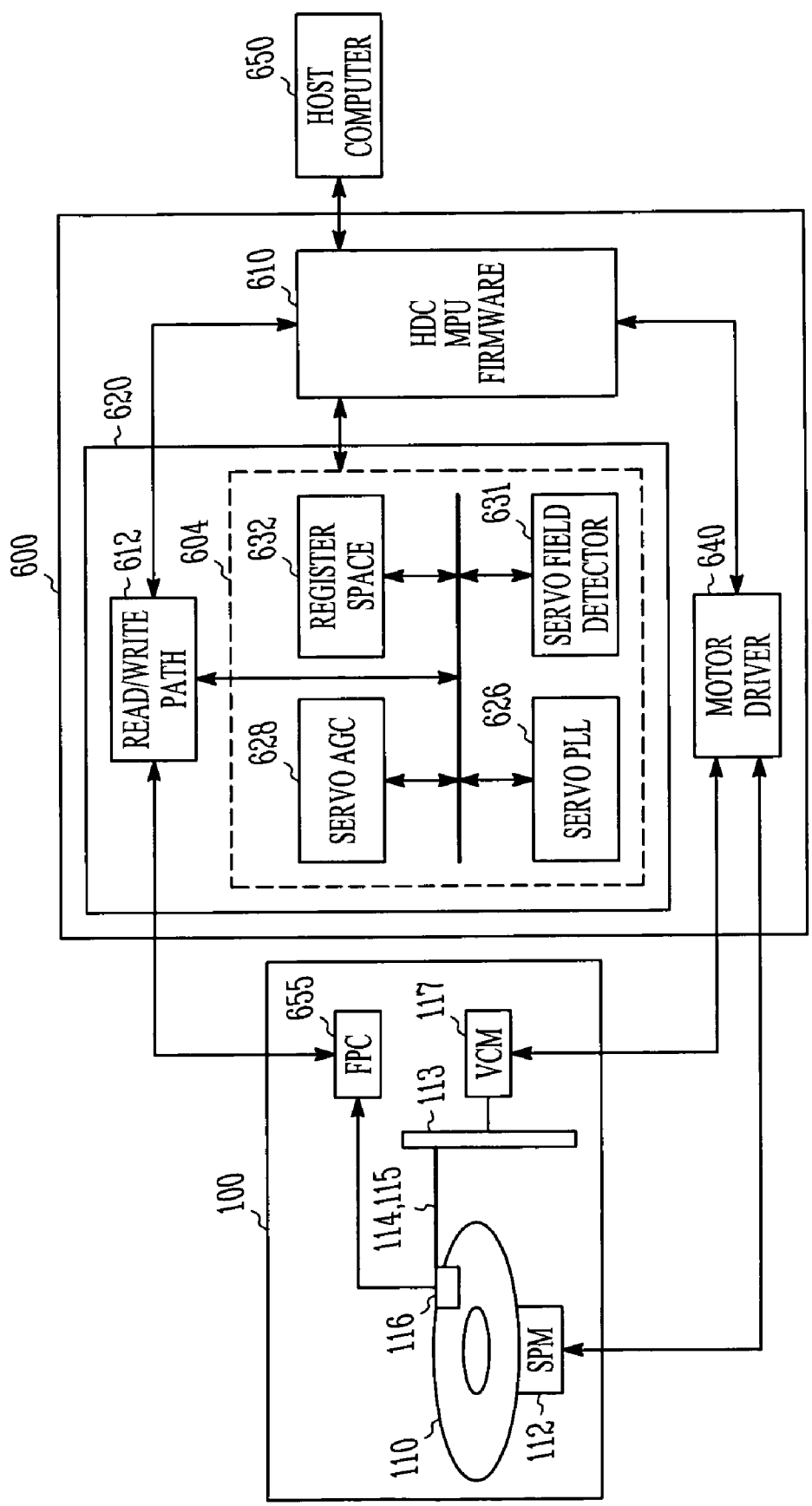
FIG. 6 is a block diagram of the magnetic recording and reproducing apparatus (disk drive) according to an example embodiment.

FIG. 6 shows a block diagram of a disk drive with a magnetic disk, according to an example embodiment. Although an example is shown, one of ordinary skill in the art, having the benefit of the present disclosure, will recognize that other device and circuit configurations are possible, and within the scope of the present invention. FIG. 6 shows the head slider 116 only above the top surface of the magnetic disk 110. However, a magnetic recording layer can be formed on each side of the magnetic disk. A down head and an up head may be provided above the bottom and top surfaces of the magnetic disk, respectively. The disk drive includes a main body unit called the HDA 100 and a printed circuit board (PCB) 600.

As shown in FIG. 6, the HDA 100 has the magnetic disk 110, the spindle motor 112, which rotates the magnetic disk 110, the head slider 116, including the read head and the write head, the suspension 115 and actuator arm 114, the VCM 117, and a head amplifier (HIC), which is not shown. The head slider 116 is provided with a read head including a read element, such as a giant magnetoresistive (GMR) element and a write head similar to elements 331 and 332 as shown in FIG. 3.

The head slider 116 may be elastically supported by a gimbal provided on the suspension 115. The suspension 115 is attached to the actuator arm 114, which is rotatably attached to the pivot 113. The VCM 117 generates a torque around the pivot 113 for the actuator arm 114 to move the head in the radial direction of the magnetic disk 110. The HIC is fixed to the actuator arm 114 to amplify input signals to and output signals from the head. The HIC is connected to the PCB 600 via a flexible cable 655. Providing the HIC on the actuator arm 114 may effectively reduce noise in the head signals. However, the HIC may be fixed to the HDA 100.

As described above, the magnetic recording layer is formed on each side of the magnetic disk 110, and the servo zones 219, each shaped like a circular arc, are formed so as to correspond to the locus of the moving head. The specifications of the magnetic disk meet outer and inner diameters and read/write characteristics adapted to a particular drive. The radius of the circular arc formed by the servo zones 219 is given as the distance from the pivot 113 to the magnet head element.

In the illustrated example embodiment, several major electronic components, so-called system LSIs, are mounted on the PCB 600. The system LSIs are a controller 610, a read/write channel IC 620, and a motor driver IC 640. The controller 610 includes a hard disk controller (HDC) and an MPU, and firmware. The MPU is a control unit of a drive system and includes ROM, RAM, CPU, and a logic processing unit that implements a head positioning control system according to the present example embodiment. The logic processing unit is an arithmetic processing unit comprised of a hardware circuit to execute high-speed calculations. Firmware for the logic processing circuit is saved to the ROM or elsewhere in the disk drive. The MPU controls the drive in accordance with firmware. The PCB 600 may include other components as described above with the example of FIG. 1. For example, there may be a buffer RAM, which may be contained in a separate DRAM chip.

Some of the circuits mentioned above may be contained on the same LSI. The HDC is an interface unit in the disk drive which manages the whole drive by exchanging information with interfaces between the disk drive and a host computer 650 (for example, a personal computer) and with the MPU, read/write channel IC 620, and motor driver IC 640.

The read/write channel IC 620 is a head signal processing unit relating to read/write operations. The read/write channel IC 620 is shown as including a read/write path 612 and a servo demodulator 604. The read/write path 612, which can be used to read and write user data and servo data, may include front end circuitry useful for servo demodulation. The read/write path 612 may also be used for self-servowriting. It should be noted that the disk drive also includes other components, which are not shown because they are not necessary to explain the example embodiments.

The servo demodulator 604 is shown as including a servo phase locked loop (PLL) 626, a servo automatic gain control (AGC) 628, a servo field detector 631 and register space 632. The servo PLL 626, in general, is a control loop that is used to provide frequency and phase control for the one or more timing or clock circuits (not shown in FIG. 6) within the servo demodulator 604. For example, the servo PLL 626 can provide timing signals to the read/write path 612. The servo AGC 628, which includes (or drives) a variable gain amplifier, is used to keep the output of the read/write path 612 at a substantially constant level when servo zones 219 on one of the magnetic disks 110 are being read. The servo field detector 631 is used to detect and/or demodulate the various subfields of the servo zones 219, including a SAM (Servo Address Mark), a track number, a first servo burst, and a second servo burst. The MPU is used to perform various servo demodulation functions (e.g., decisions, comparisons, characterization and the like) and can be thought of as being part of the servo demodulator 604. In the alternative, the servo demodulator 604 can have its own microprocessor.

One or more registers (e.g., in register space 632) can be used to store appropriate servo AGC values (e.g., gain values, filter coefficients, filter accumulation paths, etc.) for when the read/write path 612 is reading servo data, and one or more registers can be used to store appropriate values (e.g., gain values, filter coefficients, filter accumulation paths, etc.) for when the read/write path 612 is reading user data. A control signal can be used to select the appropriate registers according to the current mode of the read/write path 612. The servo AGC value(s) that are stored can be dynamically updated. For example, the stored servo AGC value(s) for use when the read/write path 612 is reading servo data can be updated each time an additional servo zone 219 is read. In this manner, the servo AGC value(s) determined for a most recently read servo zone 219 can be the starting servo AGC value(s) when the next servo zone 219 is read.

The read/write path 612 includes the electronic circuits used in the process of writing and reading information to and from the magnetic disks 110. The MPU can perform servo control algorithms, and thus, may be referred to as a servo controller. Alternatively, a separate microprocessor or digital signal processor (not shown) can perform servo control functions.

Track Spacing

Figure 7:
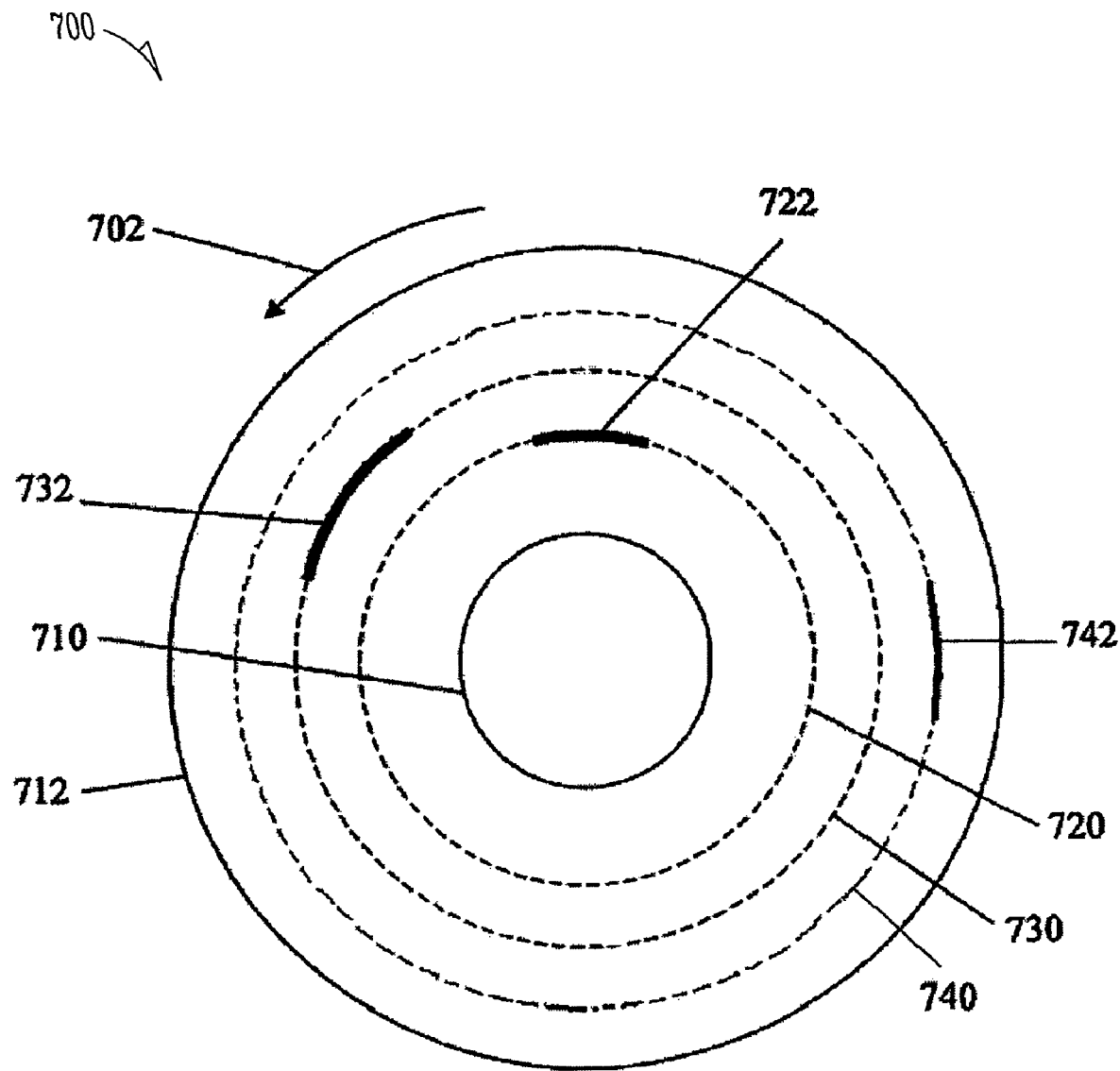
FIG. 7 is a schematic plan view of a magnetic disk in operation according to an example embodiment.

FIG. 7 illustrates a magnetic disk 700 having an inner diameter 710 and an outer diameter 712. During operation, the magnetic disk 700 may be spinning in the direction 702 as indicated in the figure. A first track 720 is shown being adjacent to a second track 730 on an inner radial location. The first track 720 is also shown being adjacent to a third track 740 on an outer radial location. The separation between the tracks in the figure is much larger than the spacing between actual tracks would be in an actual disk drive. This is for purposes of illustration, to make it easier for the reader to distinguish the tracks.

In the current example, the first track 720 may include information section 722, the second track 730 may include information section 732, and the third track 740 may include information section 742. The locations of the information sections 722, 732 and 742 are shown for illustrative purposes only, and they may be located anywhere on their corresponding tracks. For example, the information sections 722, 732 and 742 may be located adjacent to one another on their corresponding tracks. Typically, the tracks on the disk 700 may be equally spaced and may be set based on number of tracks per inch (TPI). This is also referred to as track spacing. For example, the track spacing between the tracks 720 and 730 is the same as the track spacing between the tracks 730 and 740. Low TPI means there are fewer tracks per inch (or more space between two adjacent tracks) and thus may correspond to less storage capability. Normal TPI means there are more tracks per inch (or less space between two adjacent tracks) than low TPI and thus may correspond to higher storage capability.

In general, when a track experiences a high frequency of write operations (e.g., a million write operations), the information stored on the adjacent tracks may be affected. The write operations may be related to one or more files being rewritten many times. A predetermined threshold may be used to determine when the number of write operations is considered to be high for the purpose of the ATE refresh. This predetermined threshold may be referred to as an ATE threshold. A software or hardware ATE counter may be used. For example, when the number of times that the information section 732 on the track 730 is written exceeds the ATE threshold, the integrity of the information section 722 and the information section 742 on the adjacent tracks 720 and 740 may be affected. This may be due to the leakage of the magnetic field associated with the write operations. To avoid losing the information on the adjacent tracks, the ATE refresh may be necessary for these adjacent tracks. Any ATE refresh algorithms may be used.

For some example embodiments, the ATE threshold may be set by a disk drive manufacturer. For some example embodiments, the ATE threshold may be subsequently modified by software and/or hardware installed in the disk drive by the disk drive manufacturer.

Track spacing may have a large influence on whether there is a need to perform the ATE refresh. One approach is to use low TPI for all tracks to reduce the need for the ATE refresh; however, that comes with the cost of storage capacity. Another approach is to use normal TPI for all tracks and perform the ATE refresh more frequently (e.g., after each one-hundred thousand write operations) to avoid losing the information on the adjacent tracks; however, that comes with the cost of overhead and performance. In general, when using low TPI (the track spacing is high), the susceptibility to ATE is reduced.

Different TPI Regions

FIGS. 8A-8E illustrates some examples of various combinations of track spacing, in accordance with some example embodiments. For some example embodiments, the tracks on a magnetic disk may be arranged such that some tracks may be associated with low TPI while other tracks may be associated with normal TPI. The tracks associated with low TPI may be used to store information that is associated with high frequency of write operations. The tracks associated with the normal TPI may be used to store information that is not associated with the high frequency of write operations. The information may be stored in one or more files. Each of the examples illustrated in FIGS. 8A-8E corresponds to a section of a magnetic disk similar to the example magnetic disk 700 with the inner diameter 710 and the outer diameter 712. It may be noted that the number of tracks illustrated in each of the FIGS. 8A-8E is for illustrative purposes only. There may be, for example, 100,000 tracks.

Figure 8A:
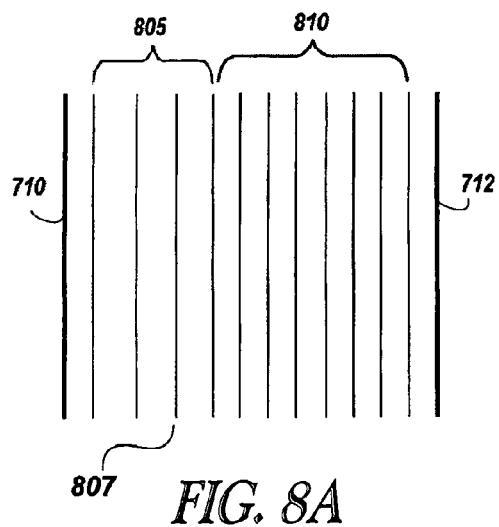
FIGS. 8A-8E illustrates examples of different TPI regions on a magnetic disk according to an example embodiment.

Referring to FIG. 8A, there may be two TPI regions, a low TPI region 805 and a normal TPI region 810. The low TPI region 805 may include tracks that have larger track spacing (i.e., more spacing between adjacent tracks), while the normal TPI region 810 may have normal track spacing. Since track 807 is in the low TPI region 805, high frequency of write operations on the track 807 may not cause its adjacent tracks to need the ATE refresh as often as if the track 807 was to be in the normal TPI region 810. In the current example, the low TPI region 805 is located closer to the inner diameter 710, while the normal TPI region 810 is located closer to the outer diameter 712.

Figure 8B:
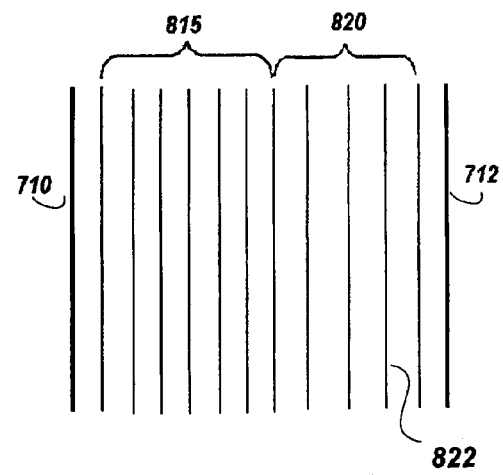
Figure 8C:
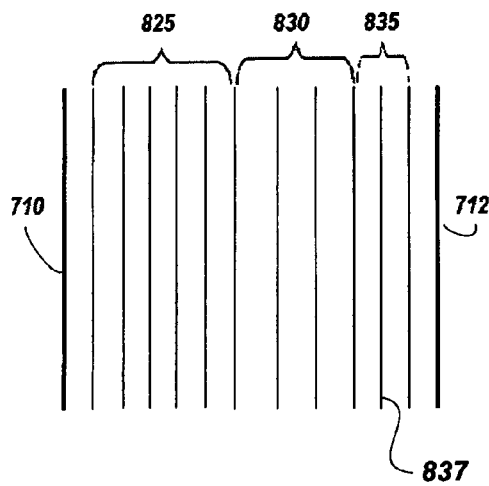
Figure 8D:
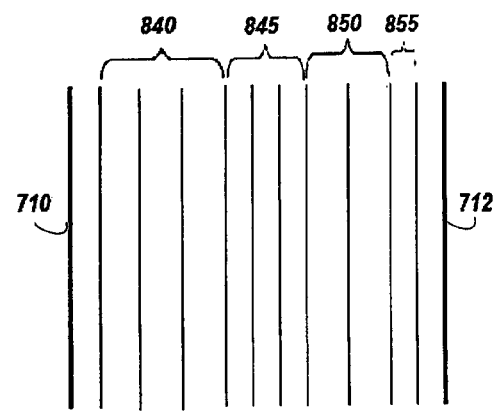

FIG. 8B illustrates an example having a low TPI region 820 located near the outer diameter 712, and a normal TPI region 815 located near the inner diameter 710. High frequency of write operations on track 822 in this example may not cause its adjacent tracks to need the ATE refresh as frequently as if that track were in the normal TPI region 815. FIG. 8C illustrates an example having a low TPI region 830 and two normal TPI regions 825 and 835, where the low TPI region 830 is located away from both the inner diameter 710 and the outer diameter 712. FIG. 8D illustrates an example having multiple low TPI regions. Here, the low TPI regions 840 and 850 are located among the normal TPI regions 845 and 855. As can be seen in these examples, embodiments of the present invention may include multiple low TPI regions. It may be noted that having a low TPI region may reduce the storage capacity of a magnetic disk; however, the trade off to this is the increase in performance because a track in the low TPI region may withstand a significantly higher number of write operations than a track in a normal TPI region before requiring an ATE refresh. If a disk drive is used in such a way that most high-frequency accesses occur within a small fraction of the drive's capacity (for example, due to operating-system accesses to the bottom 1,000,000 blocks of a drive that contains 200,000,000 blocks), the need for ATE refresh operations may be greatly reduced with a very small decrease in the drive's overall capacity.

For some example embodiments, there may be several low TPI regions with each of the low TPI regions being associated with different track spacing. Referring to the example in FIG. 8E, there are two normal TPI regions 860 and 870. There are also two low TPI regions 865 and 875. The track spacing associated with the low TPI region 875 is less than the track spacing associated with the low TPI region 865.

Figure 8E:
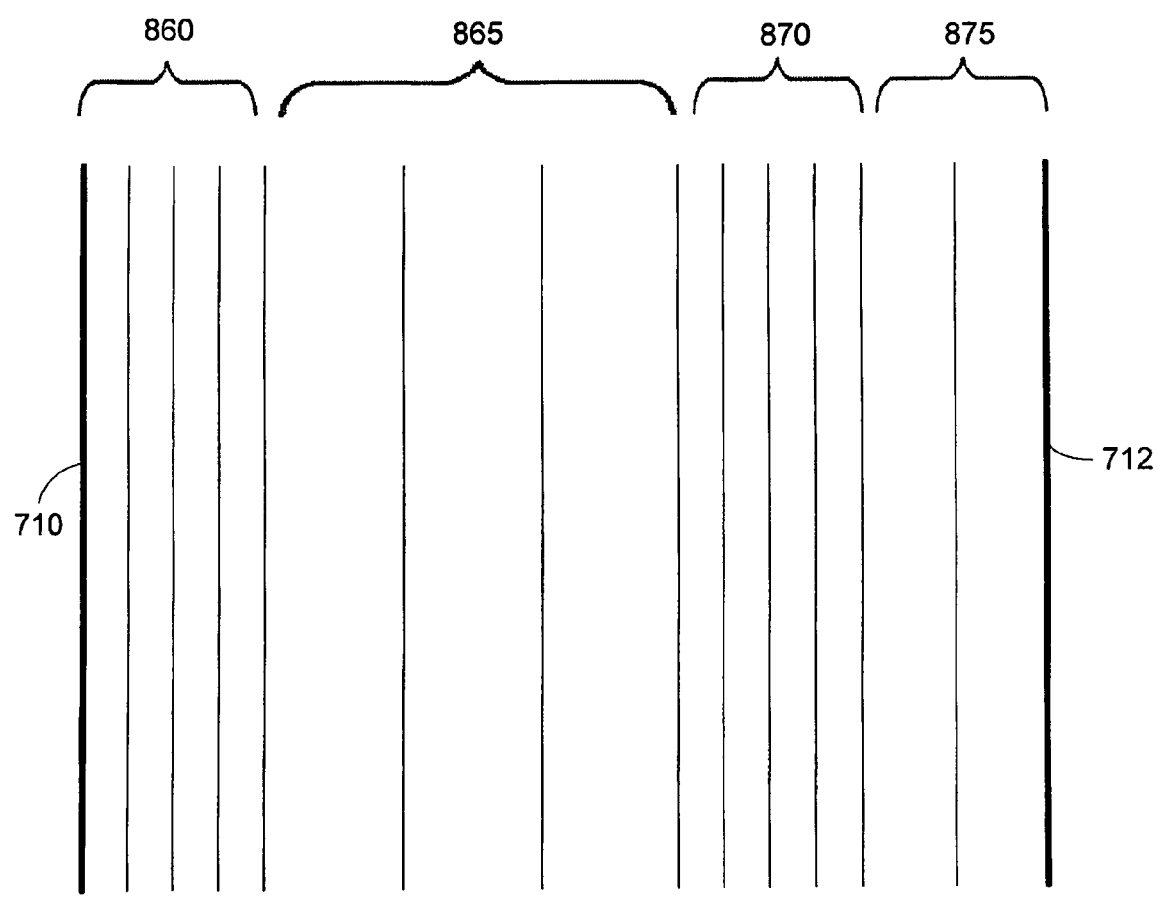

For some example embodiments, transition from a low TPI region to a normal TPI region can be either sudden or gradual. Referring to FIG. 8E, the normal TPI region 860 is adjacent to the low TPI region 865. As may be noted, even though the low TPI region 875 has less track spacing than the low TPI region 865, it is possible but not required for the low region 875 to be located between the normal TPI region 860 and the low TPI region 865.

As may be noted in the examples in FIGS. 8A-8E, the location of any of the low TPI regions on a magnetic disk may be random, and therefore is not restricted to a particular track or to store any type of specific information. Thus, a track in a low TPI region may be used to store system information, user information or both system and user information.

Dynamic Generation of the Low TPI Region

For some example embodiments, the configuration of the low TPI region may be performed dynamically. A magnetic disk may initially be formatted for a default number of tracks with all of the tracks being associated with a normal TPI region. As a number of tracks that experiences the ATE refresh increases, an operation may be performed to reconfigure the tracks into at least one low TPI region and at least one normal TPI region. This operation may involve copying the information on the tracks, reconfiguring the disk and the tracks into the different TPI regions, and copying the information back onto the disk. This operation may be performed using firmware provided by the disk drive manufacturer.

Relocation of Information to Low TPI Region

For some example embodiments, the magnetic disk may be preconfigured with at least one low TPI region and at least one normal TPI region. For example, if it is determined that the bottom one percent of the blocks in a magnetic disk are the ones that are used to store system information, and the system information may get rewritten all the time, it may be advantageous to configure the tracks associated with these blocks to be in a low TPI region (with higher track spacing) and the remaining tracks in a normal TPI region.

For some example embodiments, the disk drive may be configured with logic that keeps track of the frequency of write operations for one or more of the tracks in the normal TPI region. The logic may be implemented in software, hardware, or a combination of both hardware and software. The logic may use a relocation threshold to determine when relocation of information on a track in the normal TPI region to a track in the low TPI region may be necessary. A software or hardware relocation counter may be used. For some example embodiments, the relocation threshold may be lower than the ATE threshold. For example, when the ATE threshold is related to one million write operations, the relocation threshold may be related to eight hundred thousand write operations. This may enable the relocation to occur before there is a need for the ATE refresh. For example, referring to FIG. 8C, when it is determined (based on the relocation threshold) that there is track 837 in the region 835 that is experiencing high frequency of write operations, the logic may relocate the information on the track 837 to a track in the low TPI region 830, even though the number of write operations on the track 837 has not exceeded the ATE threshold. Alternatively, it may be advantageous to relocate the information only after the number of write operations to the corresponding track has exceeded the ATE-refresh threshold multiple times (which may be interpreted as evidence that the track is, indeed, being written to very often). It is also possible that the relocation of information in the often-written tracks might take place at the same time that the adjacent tracks are re-written.

Flow Diagram

Figure 9:
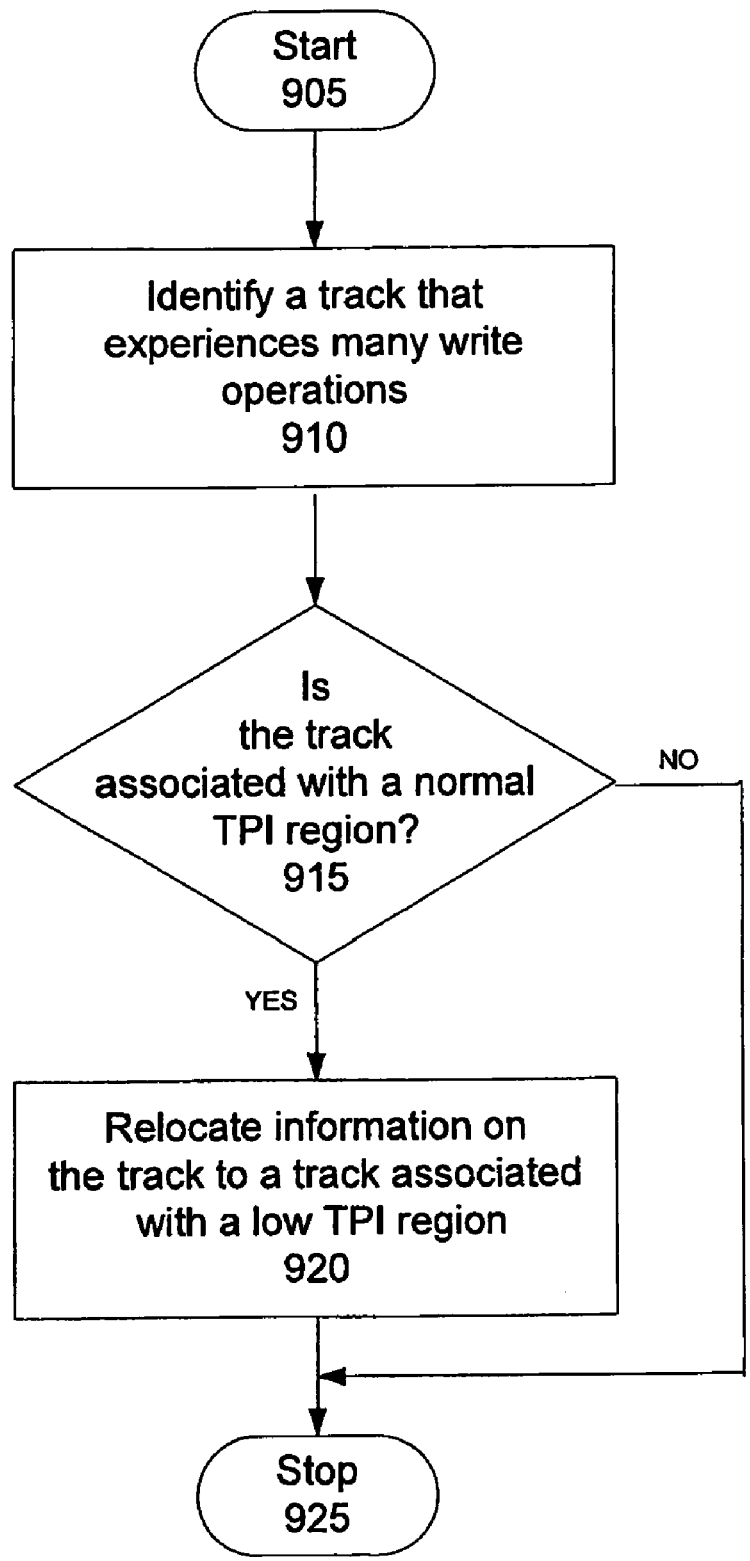
FIG. 9 is a flow diagram of a method according to an example embodiment.

FIG. 9 illustrates an example flow diagram as described in some example embodiments described herein. The flow diagram may be related to a method or a process that may be used to perform operations to help reducing the need for ATE refresh. The process may start at block 905. At block 910, a track on a magnetic disk is identified when that track experiences many write operations. As noted above, a relocation threshold may be used to determine if the number of write operations may become too high. At block 915, it is determined whether the track is associated with a normal TPI region. If it is, the process may continue to block 920 where the information on the track may be relocated to another track that is associated with a low TPI region.

From block 915, if the track is already associated with a low TPI region, the process may continue to block 925 and no relocation operations may need to be performed. This is because the track can probably withstand many more write operations without requiring the ATE refresh. The process may stop at block 925. One of ordinary skill in the art, having the benefit of the present disclosure will recognize that other variations of process are also within the scope of embodiments of the invention.

For some example embodiments, the tracks in the low TPI region may be exempt from the ATE refresh. For some other example embodiments, a second ATE threshold may be used for the tracks in the TPI region. The second ATE threshold may be higher than the ATE threshold used for the tracks in the normal TPI region.

Computer System

Figure 10:
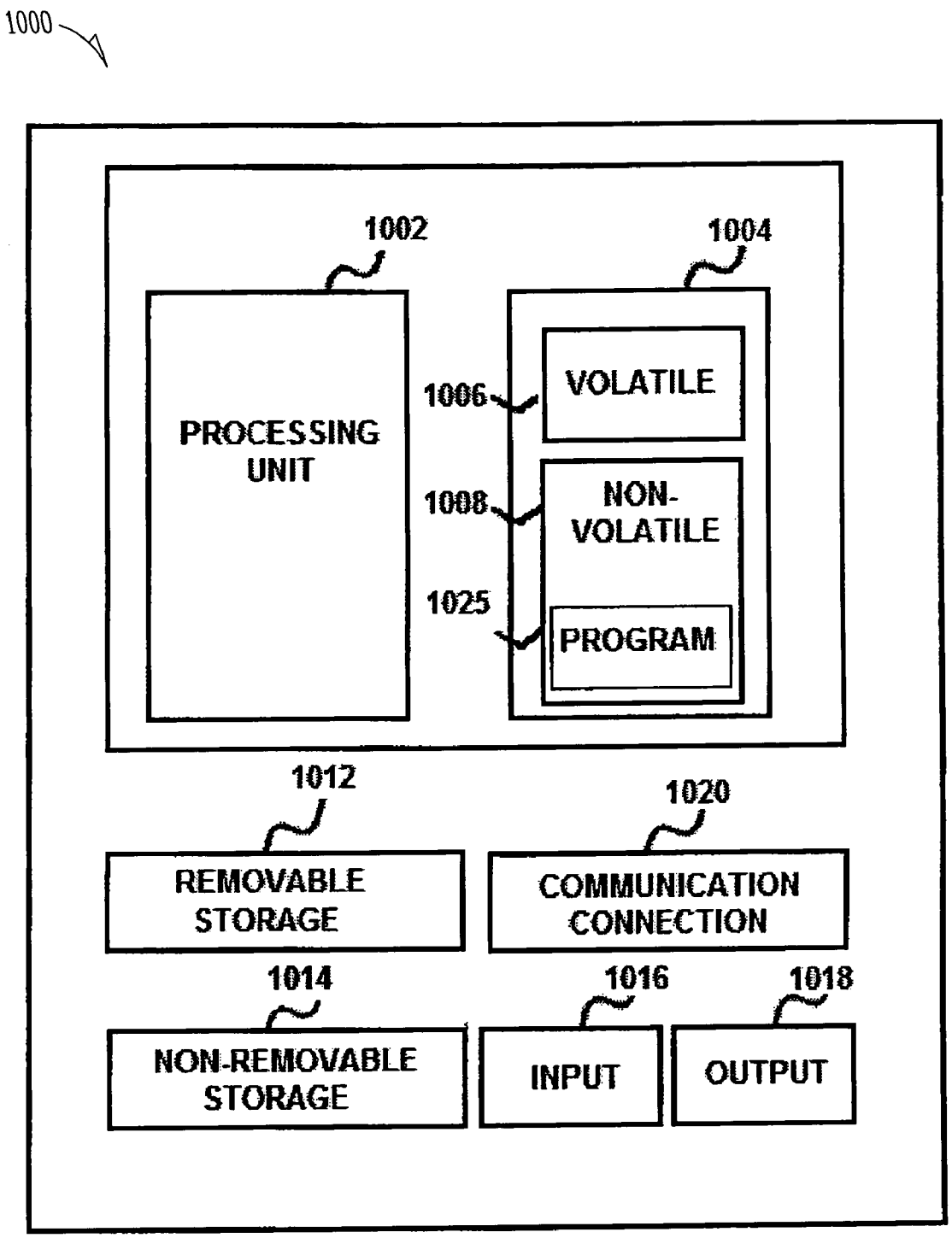
FIG. 10 is an example block diagram of a computer system for implementing methods and devices as described in accordance with example embodiments.

FIG. 10 illustrates an example computer system that may be used, in accordance with some example embodiments. Software to calculate and perform the drive operations as described above is typically stored in firmware within the hard drive although example embodiments are not so limited. Computer system 1000 may be used to execute instructions to perform methods as described. The computer system 1000 may include a processing unit 1002, memory 1004, removable storage 1012, and non-removable storage 1014. The memory 1004 may include volatile memory 1006 and non-volatile memory 1008. Computer system 1000 may include—or have access to a computing environment that includes—a variety of computer-readable media, such as volatile memory 1006 and non-volatile memory 1008, removable storage 1012 and non-removable storage 1014. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer system 1000 may include or have access to a computing environment that includes input 1016, output 1018, and a communication connection 1020. The computer system 1000 may operate in a networked environment using the communication connection 1020 to connect to one or more remote computers. The remote computer may include a personal computer (PC), server, router, network PC, a peer device or other common network node, or the like. The communication connection 1020 may include a Local Area Network (LAN), a Wide Area Network (WAN) or other networks. The controller 610 (described above in the example in FIG. 6) or other selected circuitry or components of the disk drive may be such a computer system.

In the current example, computer program 1025 may be stored in non-volatile memory 1008. In some situations, the computer program 1025 may be stored in volatile memory 1006. In fact, most programs run by PCs run in DRAM, which is volatile memory. For disk-drives, some program code may be in non-volatile memory, and some may be in volatile memory. The computer program 1025 may include computer-readable instructions and may be stored on a computer-readable medium and executable by the processing unit 1002 of the computer system 1000. A disk drive, CD-ROM, and RAM are some examples of articles including a computer-readable medium. As mentioned above, the computer program 1025 may also be termed firmware associated with the disk drive. In some example embodiments, a copy of the computer program 1025 can also be stored on the magnetic disk 110 of the HDA 100 (described above).

The foregoing description of the specific example embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed example embodiments.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A hard disk assembly (HDA) apparatus comprising:
at least one disk;
a spindle motor coupled to the disk; and
a read/write head to read information from and to write information onto a plurality of tracks on the disk, wherein the plurality of tracks comprises a first group of tracks and a second group of tracks, and wherein track spacing associated with the first group of tracks is less than tracking spacing associated with the second group of tracks, and wherein the information to be stored in the first group of tracks is configured to be relocated to the second group of tracks based on a first threshold associated with a frequency of write operations on tracks in the first group which is lower than a second threshold used to determine when an adjacent-track-erasure (ATE) refresh is needed for tracks in the second group of tracks.

2. The apparatus of claim 1, wherein the information is associated with high frequency of write operations.

3. The apparatus of claim 1, wherein a number of tracks in the second group of tracks is less than a number of tracks in the first group of tracks.

4. The apparatus of claim 1, wherein the first threshold is used to determine when to relocate the information from the first group of tracks to the second group of tracks.

5. The apparatus of claim 1, wherein the plurality of tracks comprises multiple groups of tracks having track spacing similar to the tracking spacing of the second group of tracks.

6. The apparatus of claim 1, wherein the information relocated in the second group of tracks includes one or more of system information and user information.

7. A method of reducing a need for adjacent track erasure (ATE) refresh, the method comprising:
storing a first set of information in one or more tracks associated with a normal track-per-inch (TPI) region of a magnetic disk of a hard disk assembly (HDA);
storing a second set of information in one or more tracks associated with a low TPI region, wherein information in the second set of information includes one or more of system information and user information, and wherein the low TPI region is within close proximity to the normal TPI region; and relocating at least a portion of the first set of information from the normal TPI region to the low TPI region, the relocating being based on a first threshold associated with a frequency of write operations being lower than a second threshold used to determine when an adjacent-track-erasure (ATE) refresh is needed for the one or more tracks in the low TPI region.

8. The method of claim 7, further comprising:
identifying information stored on a first track of the normal TPI region and associated with a frequency of write operations.

9. The method of claim 7, wherein said relocating is to occur before the ATE refresh.

10. The method of claim 7, wherein said relocating is to occur after the ATE refresh.

11. A method comprising:
identifying a file stored on a first track that is being rewritten many times, the first track being one of a plurality of tracks on a magnetic disk of a disk drive, the first track belonging to a normal track-per-inch (TPI) region;
determining if a number of times that the file is being rewritten exceeds a relocation threshold; and
based on a determination that the number of times that the file is being rewritten exceeds the relocation threshold, relocating the file to a second track on the magnetic disk, the second track belonging to a low TPI region, the relocating being based on the relocation threshold being lower than a second threshold used to determine when an adjacent-track-erasure (ATE) refresh is needed for tracks in the low TPI region.

12. The method of claim 11, wherein the low TPI region is within close proximity to the normal TPI region.

13. The method of claim 11, wherein said relocating is performed to reduce a need for the ATE refresh for tracks adjacent to the first track.

14. The method of claim 11, wherein a number of tracks in the low TPI region is less than a number of tracks in the normal TPI region.

15. The method of claim 11, wherein the need for the ATE refresh for tracks in the low TPI region is less than the need for the ATE refresh associated with tracks in the normal TPI region.

16. The method of claim 11, wherein the low TPI region is adjacent to the normal TPI region.

* * * * *